US 6,708,929 B1

(12) United States Patent
Gabriel

(10) Patent No.: US 6,708,929 B1
(45) Date of Patent: Mar. 23, 2004

(54) SIMPLIFIED BUOYANCY SYSTEM FOR AVOIDING AIRCRAFT CRASHES

(76) Inventor: Edwin Zenith Gabriel, 91 Mt. Tabor Way, Ocean Grove, NJ (US) 07756

( * ) Notice: Subject to any disclaimer, the term of this patent is extended or adjusted under 35 U.S.C. 154(b) by 260 days.

(21) Appl. No.: 09/655,299

(22) Filed: Sep. 5, 2000

Related U.S. Application Data

(63) Continuation-in-part of application No. 09/583,442, filed on May 31, 2000, which is a continuation-in-part of application No. 09/514,125, filed on Feb. 28, 2000, which is a continuation-in-part of application No. 09/470,737, filed on Dec. 23, 1999.

(51) Int. Cl.⁷ .................................................. B64C 21/04
(52) U.S. Cl. ........................................................ 244/207
(58) Field of Search ................................ 244/201–209, 244/130, 210

(56) References Cited

U.S. PATENT DOCUMENTS

| | | | | |
|---|---|---|---|---|
| 1,818,309 A | * | 8/1931 | De Villard | 244/210 |
| 3,190,584 A | * | 6/1965 | Gire et al. | 244/52 |
| 3,326,500 A | * | 6/1967 | Lanier | 244/211 |
| 4,962,903 A | * | 10/1990 | Byron | 244/210 |

FOREIGN PATENT DOCUMENTS

| | | | | |
|---|---|---|---|---|
| FR | 1051588 | * | 1/1954 | 244/210 |
| GB | 610143 | * | 10/1948 | 244/52 |
| GB | 735065 | * | 8/1955 | 244/12.5 |

* cited by examiner

*Primary Examiner*—Galen L. Barefoot

(57) ABSTRACT

This light aircraft crash avoidance system performs what previous such systems perform, but with much less system weight, much less cost and much less expenditure of electrical energy. In this system, air enters openings or windows in front of concentric tubing and leaves through openings facing vertically downward, thus giving lift to an aircraft's wing, where needed. Unlike other designs, this one requires no high-pressure air tanks to provide high pressure, high-velocity air to air valves. The valves depend upon the forward motion of the aircraft to provide high velocity air and lift. Two different prime movers are suggested for rotating the outer tubing for opening or closing the air valve, one being a d.c. motor and the other a rotary solenoid, as the simpler one to implement. The proposed design is for making any needed corrections to the aircraft's roll angle and for providing buoyancy to the entire aircraft when making a landing. A side benefit for this design is the ability for the aircraft's engine to save fuel on take-off and in flight, because of the added lift provided by the tubular air valves in their open positions. Openings or air outlets facing downward may be fitted with circular collars to assist in directing the high velocity out-flow air downward.

13 Claims, 14 Drawing Sheets

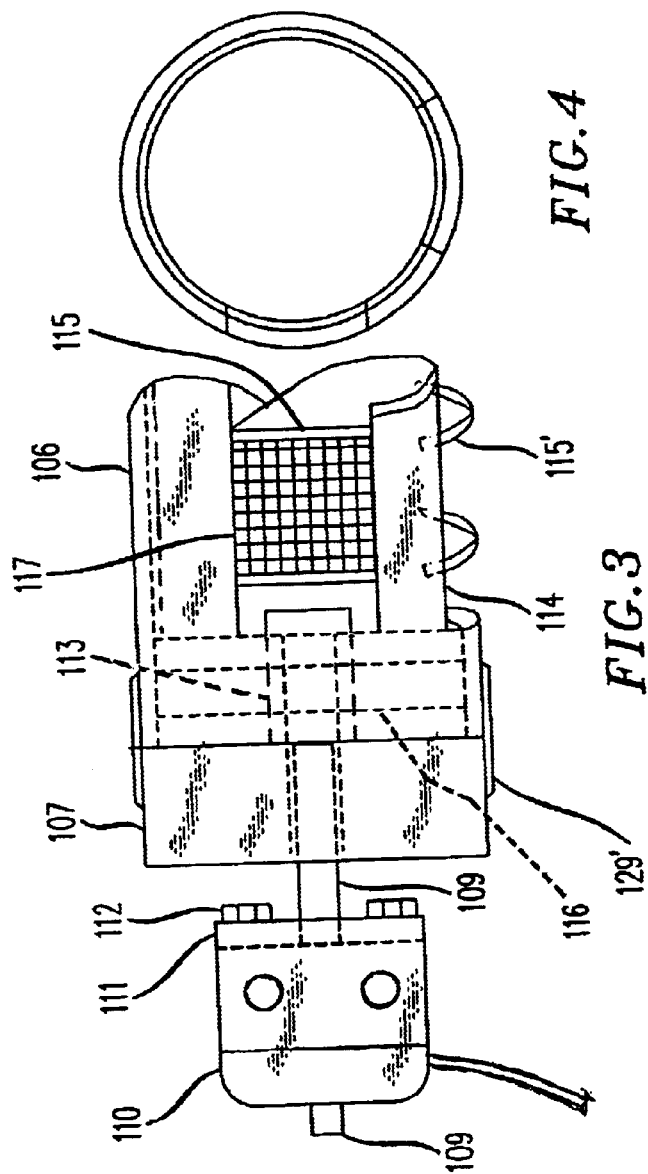
FIG. 4
FIG. 3
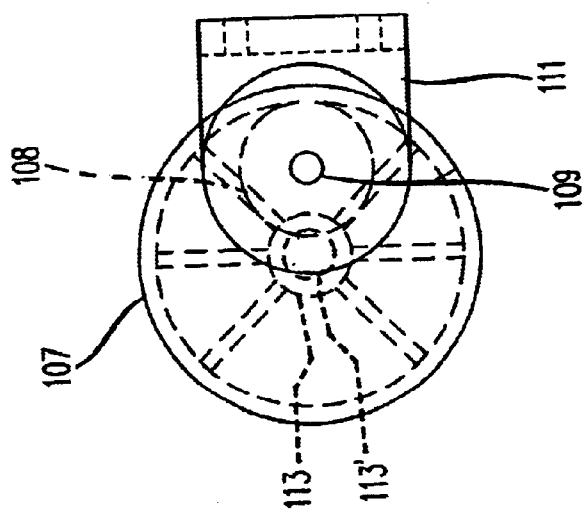
FIG. 2

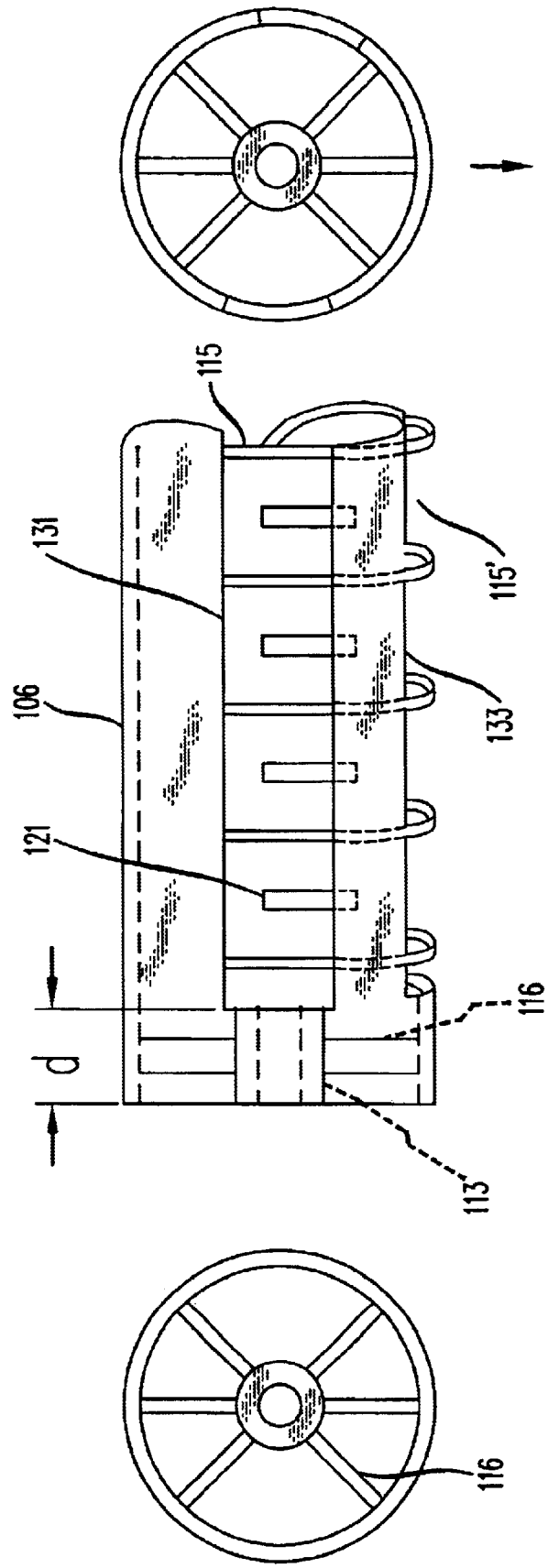

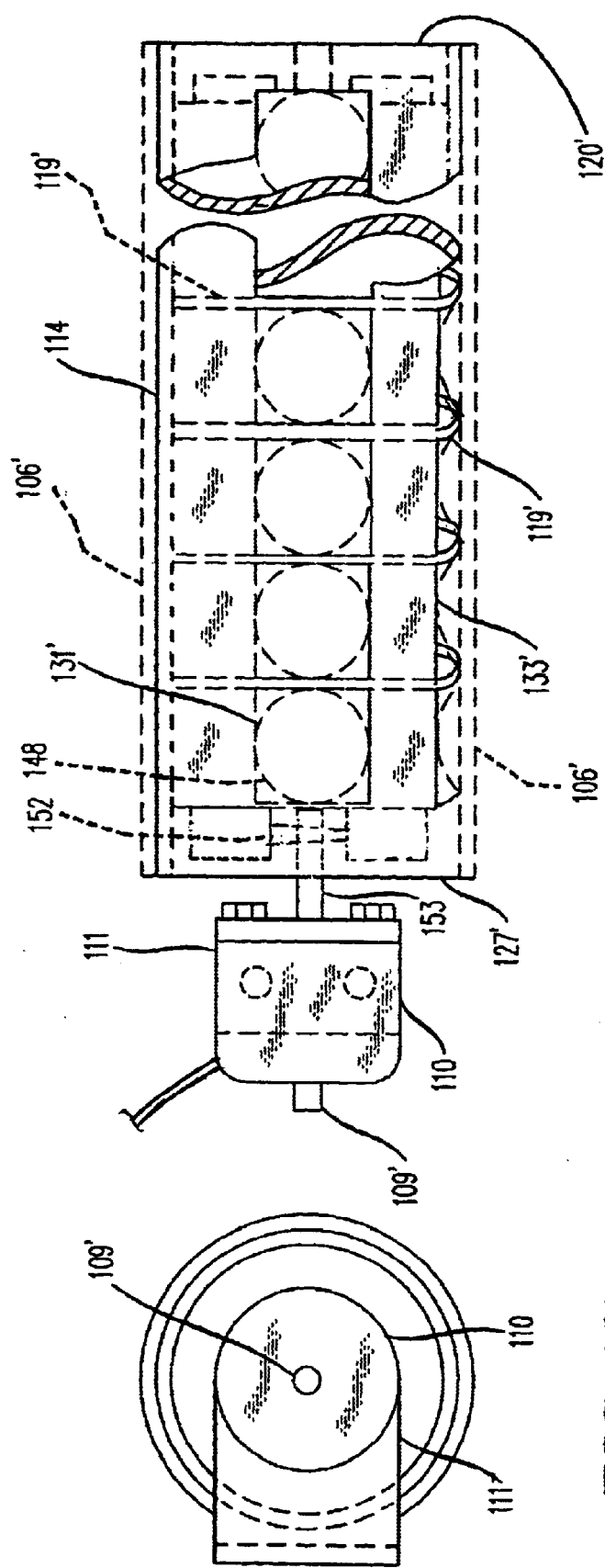

SIMPLIFIED BUOYANCY SYSTEM FOR AVOIDING AIRCRAFT CRASHES

This system is a continuation-in-part of a pending patent application, Ser. No. 09/583,442 filed May 31, 2000, which is a continuation-in-part of Ser. No. 09/514,125 filed on Feb. 28, 2000, which is a continuation-in-part of Ser. No. 09/470,737 filed on Dec. 23, 1999. The pending application included individual air valves, each with a solenoid for opening and closing a butterfly disk. This system eliminates the solenoids on the relatively small individual valves and provides elongated tubing with multiple air valves, each about three feet long, each with a single solenoid for opening and closing the elongated valve, to reduce the total weight of the system. If the valves are open on take-off from a runway, aviation fuel could be saved.

BACKGROUND OF THE INVENTION

1. Field Of The Invention

This invention is in the field of aircraft safety in flight, wherein even if the pilot were to make an error, the system will attempt to make the desired corrections to avoid and prevent the aircraft from going out of control and crashing. This disclosure with illustrations describes how the system functions to prevent an aircraft crash, by continually making any corrections to the aircraft's malfunctioning control system to keep the aircraft aloft, until it can be safely landed.

2. Description of Prior Art

The inventor is aware only of his own U.S. patent applications. The serial numbers of his applications are Ser. No. 09/366,262, filed Aug. 2, 1999, Ser. No. 09/470,737, filed Dec. 23, 1999, Ser. No. 09/514,125, filed Feb. 28, 2000.

SUMMARY OF THE APPLICATION

This is an additional novel technique for helping prevent light aircraft from crashing, should the aircraft experience engine or control system malfunction or pilot error. Instead of individual air valves, through which air blasts out, placed underneath the two wings of the aircraft, a plurality of elongated concentric coaxial tubings with elongated slots or openings are positioned underneath near the front edges of the wings. In one embodiment the outer tubing acts as a cover and rotates about the inner stationary tubing and is activated or operated by a prime mover which could be either an electric motor or rotary solenoid. The rotary motion of the outer concentric tubing is performed through a pair of pinion and internal spur gears, because of the convenience of coupling the rotatable internal gear to the outer tube. Both the inner and outer tubings have elongated openings or slots. When air is allowed to pass through the slots, the valve is in its open position and the openings of the inner and outer tubing align themselves. When it is desirable to prevent air from passing through, the electric motor or rotary solenoid rotates the outer tubing a prescribed number of degrees to close the inner openings, preventing air flow passage. Depending upon the length of an aircraft wing, more than one elongated tubing would be attached to each wing, since the geared motor is capable of rotating only a predetermined length of outer tubing comfortably, without jamming.

During aircraft take off, the tubing considered as elongated valves mounted on both wings, could be in their open positions, providing additional lift for the moving aircraft. Hence, expensive aircraft engine fuel may be saved.

BRIEF DESCRIPTION OF DRAWINGS

For the purpose of illustrating the control system for preventing light aircraft crashes, the following drawings show forms which are preferred. It is to be understood that this invention is not necessarily limited to the precise arrangement, instrumentalities and field of utility as therein demonstrated.

FIG. 2 shows an end view of an elongated concentric tubing assembly, including an end view of the prime mover.

FIG. 3 shows a partial detail drawing of one of the elongated concentric circular tubing assemblies, including the pinion gear, internal spur gear and solenoid or electric motor.

FIG. 4 is another end view, from the opposite direction of the concentric tubing assembly, without the prime mover bracket supports showing.

FIG. 5 is a partial side view of the rotatable outer tubing of the elongated tubing with multiple valves.

FIG. 6 is an end view thereof.

FIG. 7 is an end view of the opposite end.

FIG. 17 shows an end view of the inner tubing rotatable by a rotary solenoid an angle of 90°. The outer tubing shown in dashed lines is fixed in the aircraft's wing.

FIG. 18 shows a side view thereof of the elongated concentric tubular valve, with inlet and outlet ports.

DESCRIPTION OF A PREFERRED EMBODIMENT

Figure 1:
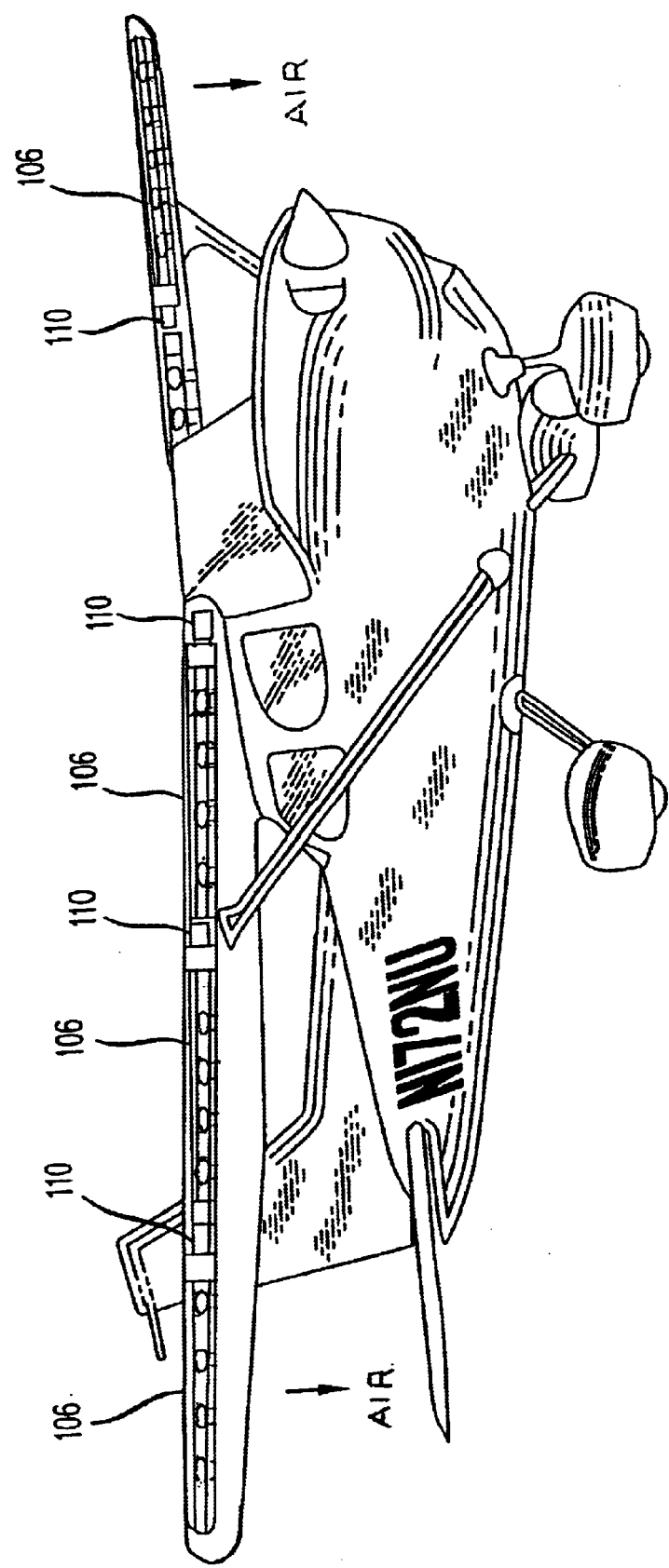
FIG. 1 shows a single-engine aircraft with several elongated, slotted tubing sections with apertures mounted in front of the wings of the aircraft, although they could be mounted underneath the wings for less visibility and less resistance to air flow.

This embodiment shown in FIG. 1 is presented as a technique using an elongated tubing with air valves not only to provide lift to a wing of an aircraft but also to enable the engine to save expensive aviation fuel on take-off from a runway, by providing such lifting. The lifting provided by elongated, slotted concentric tubing with windows as air inlets and air outlets also helps prevent the aircraft from crashing, by providing lift to a left or right wing that is turning in a downward direction too fast, beyond a predetermined allowable rate-of-turn, thus providing roll-angle control. The concentric tubings comprising the system is shown in FIGS. 2 to 9. In this configuration, the inner tubing 114 with circular or rectangular openings or windows 115 at right angles to each other is held rigid to the aircraft's frame by right angle brackets 118 FIGS. 8 and 9. Outer tubing 106 is rotatable by prime mover 110', FIGS. 2 and 3. The prime mover's shaft 109 is attached to a pinion gear 108, FIG. 2, which, when rotated, rotates internal spur gear 107. Internal gear 107 is attached to outer tubing 106 by straps 129, FIGS. 2 and 3, which may be welded or screwed to gear 107 and tubing 106. Bushing 113, for shaft 109 passing through central hole 113' of internal gear 107, is held in place by spokes 116, FIGS. 2 and 3. Slots or windows 131 and 131', FIG. 5, are held apart by reinforcement strips 115 and 119, FIGS. 3 and 8. In FIG. 3, typical screening 117 is shown for one window for keeping out insects and other foreign objects. The size of mesh for the screening would be determined by the organization having the crash avoidance system installed. Similar windows and reinforcements are provided at 90° angle from those identified as 131 and 131', FIGS. 5 and 8. The air would enter at windows 131 and 131' and pass out vertically downward at location of reinforcements, identified as 115' and 119', FIGS. 3, 5 and 8.

Figure 12:
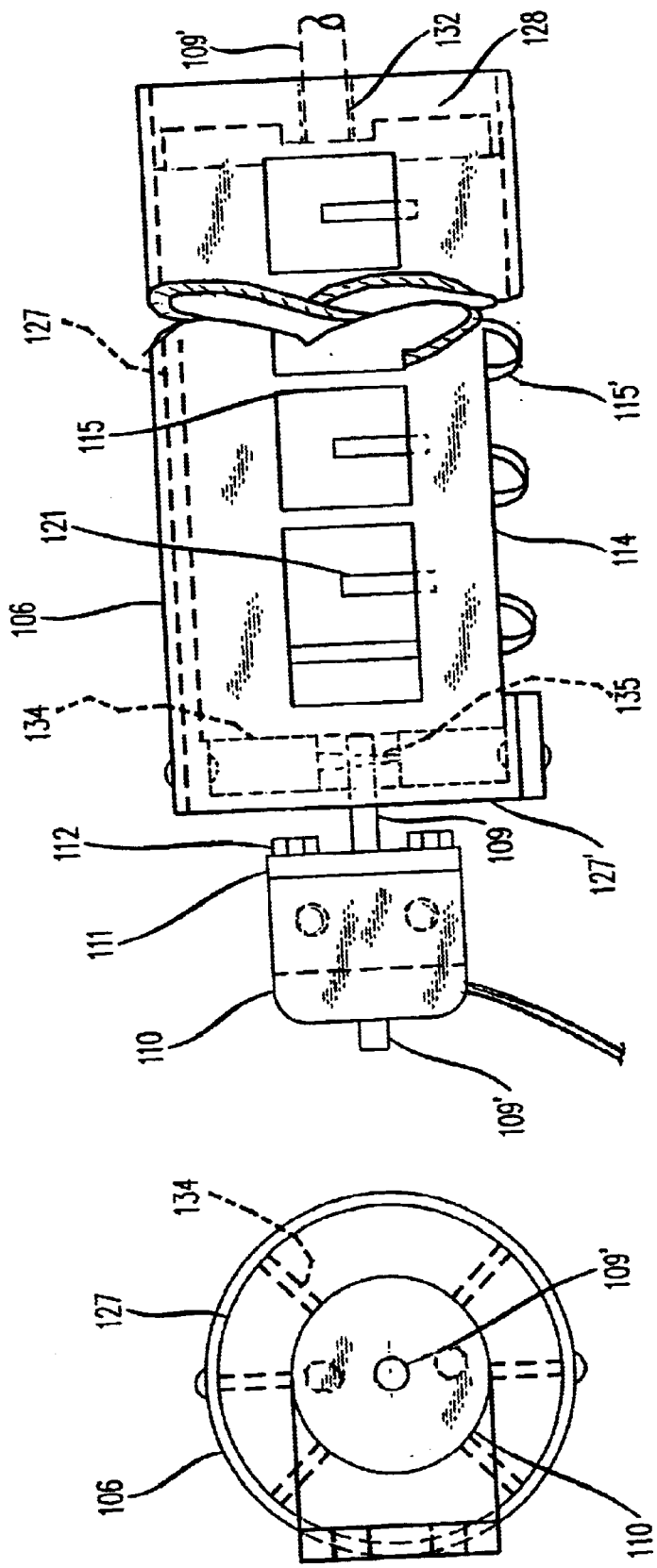
FIG. 12 is a partial side view of another elongated concentric tubing assembly with the shaft of a rotary solenoid connected directly to the inner tubing, via a cover plate. Outer tubing is not shown.

Prime Mover 110 is held in place by bracket 111, FIGS. 2 and 3. Internal spur gear 107 is held in place by outer rotatable tubing 106. The opposite end of tubing 106 is supported by a cover plate 128 with a central hole, as shown in FIG. 12. When this tubing assembly, which may be 3 feet long is placed adjacent to another such assembly, shaft 109', which is a continuation of shaft 109, inserts in hole 132. Prime Mover 110, which may be a dc motor, has its shaft rotate sufficiently to cause internal gear 107 to turn an angle of 90°. In one direction of rotation, outer tubing, which may be 5" in diameter, would close the valve's openings. When rotating in the reverse direction, outer tubing would open inlet and outlet windows 131, 131' and 133, 133', FIGS. 5 and 8. The outer cover plate for inner tubing 114 is identified by numeral 120. In outer tubing 106, slots 121 are provided to allow brackets 118, FIG. 37, to pass through and be attached to the frame of aircraft.

The advantage of the configuration of FIG. 3 over that of FIG. 12 is its higher torque capability for the same size of prime mover. FIG. 12 represents another prime mover, a rotary solenoid, with its shaft 109 capable of rotating 90°. Solenoid 110 is supported by bracket 111, FIGS. 12 and 13, and shaft 109 passes through bushing 135, attached to cover plate 127.

Outer tubing 106 only is shown in FIG. 12. Inner tubing 114 would pass through the inside of tubing 106, as shown in FIG. 3. Spokes 134 for holding bushing 135 in place are optional, as the bushing could be welded to cover plate 127. The configuration of FIG. 12 would be simpler to fabricate and would be less costly than that of FIG. 3.

Figure 11:
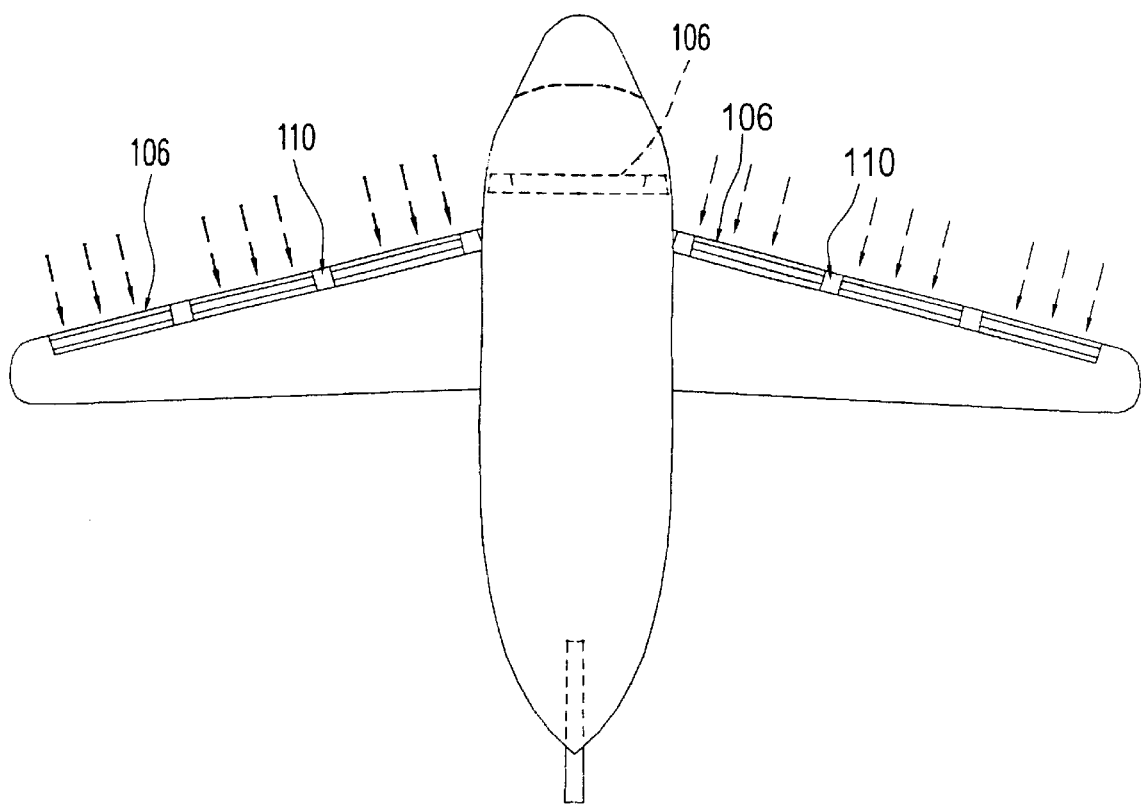
FIG. 11 shows the underneath or belly of a single-engine aircraft, with the elongated-concentric tubings with multiple air valves mounted underneath the two wings. Three concentric tubins with air valves are shown on each wing.

Three of these assemblies would be attached to each wing of the aircraft, as shown in FIGS. 1 and 11. FIGS. 1 and 40 do not necessarily represent the same aircraft, but they represent a light aircraft with suggested locations for the elongated tubing with multiple air valves. In FIG. 1, the elongated tubings are shown in front of the wings, while in FIG. 40, the tubings is shown underneath the wings.

Figure 14:
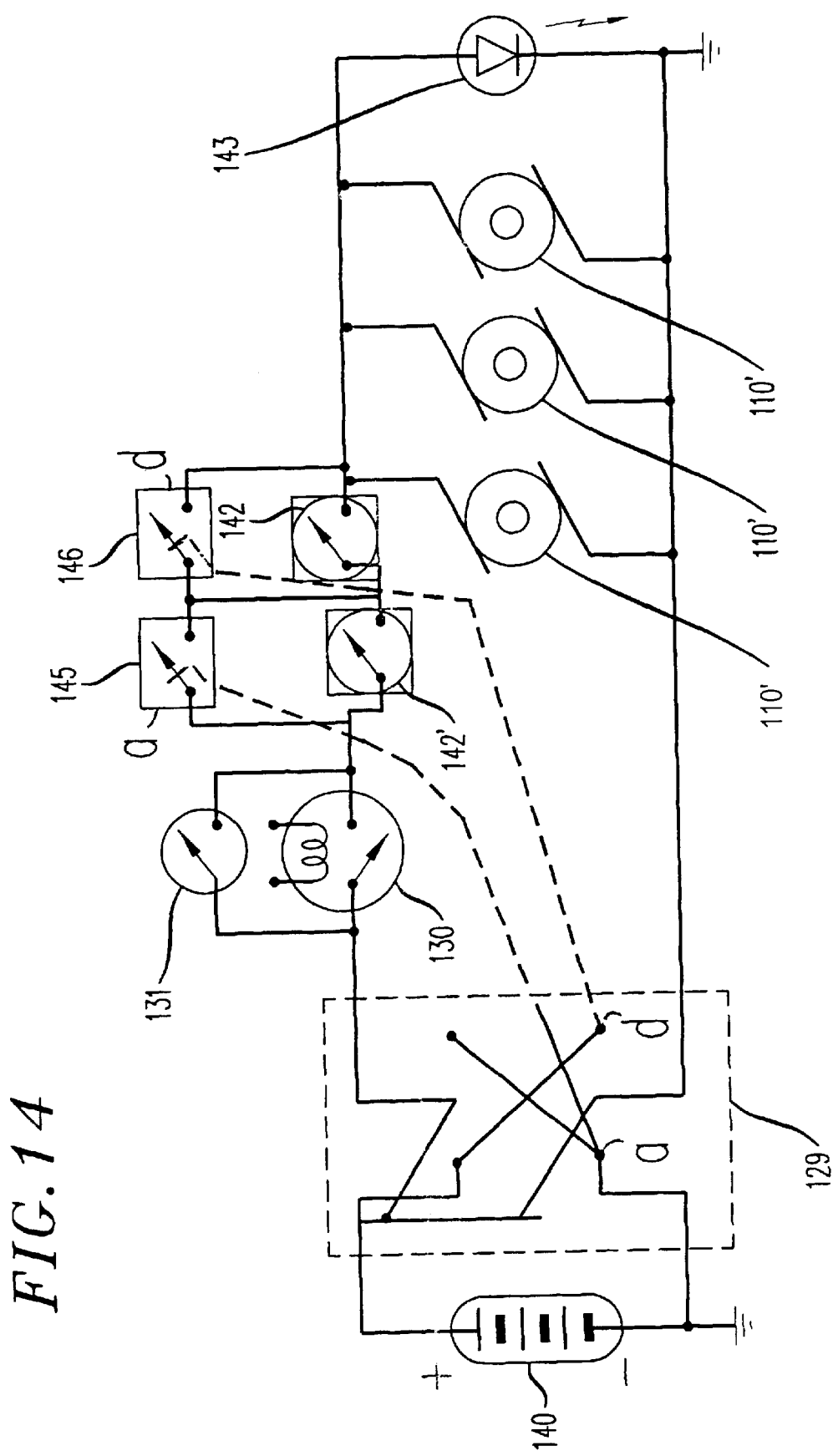
FIG. 14 is a circuit diagram for the three prime movers, dc motors, of the three concentric tubing assemblies, FIGS. 2 to 9. Included in the diagram are two manual switches, a relay, two microswitches, a power supply and an LED. This diagram would be the same for either wing.

For FIGS. 2 and 3, the circuit diagram is shown in FIG. 14. In this circuit, dc electric motors 110' are energized by power supply 140, via double-pole, double throw (DPDT) switch 129, relay 130 and Micro-Switches 142, 142'. Relay 130, activated by a roll rate-of-turn sensor, to close the circuit, can be by-passed by manual switch 131, to open tubular valves 106, FIGS. 3, 12, for high velocity air to pass through, provided DPDT switch is closed, as well as Micro Switches 142 and 142'. DPDT switch enables reversal of DC motors 110'. When switch 129 is closed in the direction of "a", dc motors 110' rotate in one direction; when closed in the direction of "b", dc motors 110' rotate in the opposite direction. When rotating in one direction, say 90°, pinion gear 108 on motor shaft 109, makes contact with Micro Switch 142, opening the circuit of FIG. 14. When rotating in the opposite direction, say 90°, pinion gear 108 makes contact with Micro Switch 142', opening the circuit, until motor shaft 109 is reversed in direction by DPDT switch 129.

Figure 10:
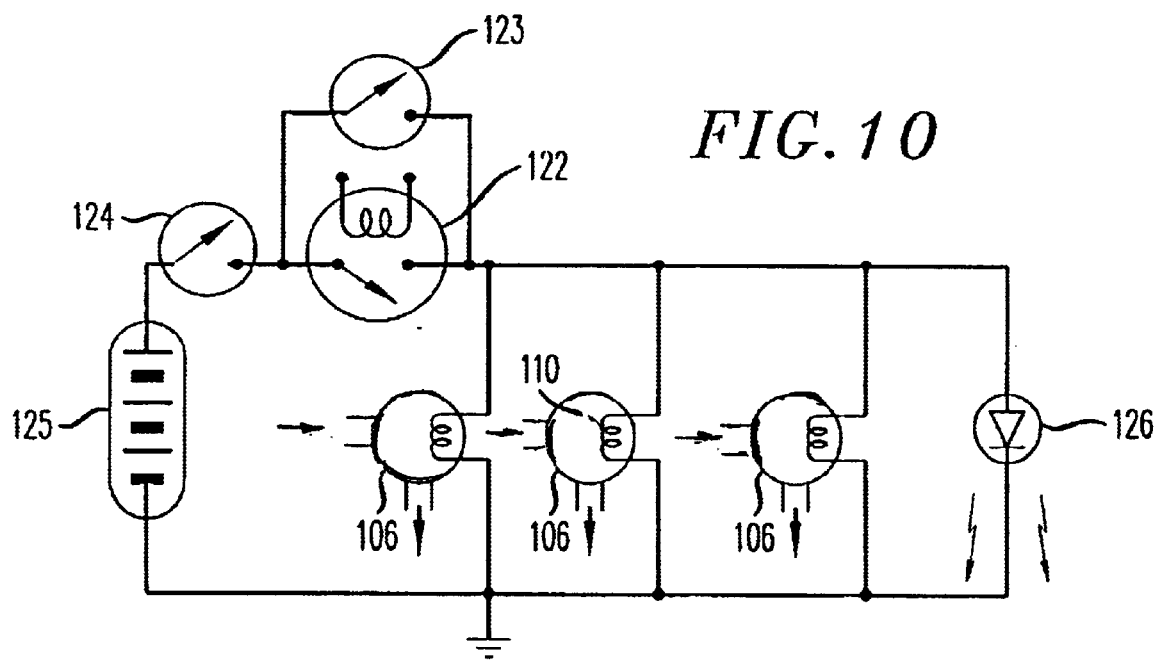
FIG. 10 is a schematic drawing of the electrical connections for the three prime movers, solenoids, of three concentric tubing assemblies, FIGS. 12 and 13. Included in the schematic are two manual switches, a relay, an LED and the power supply. This schematic would be the same for either wing.
Figure 13:
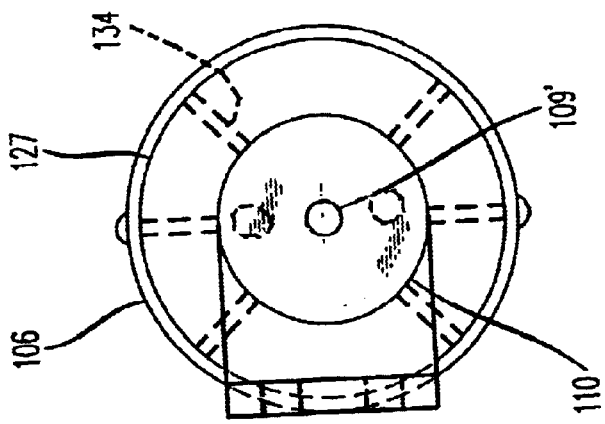
FIG. 13 is an end view thereof.

FIG. 10 shows a circuit diagram for the solenoids shown in FIGS. 12 and 13. The rate-of-turn sensor providing a conditioned signal, would activate relay 122 closing the circuit, provided manual switch 114 is closed, whenever one of the wings of the aircraft rotates at a rate greater than a predetermined value, thus making corrections to the angle of roll, while the aircraft is in flight. One solenoid is shown for each, say, three feet of concentric tubing. Thus, for nine feet of tubing three elongated valves are shown. The schematic for tubing 106 and solenoid 110 in FIG. 10, has been very simplified. When the valve cover opens the inner tubing's slots, air passes through from front to bottom or underside to provide buoyancy to the aircraft's wing. When the valve cover closes, air passage ceases.

When the roll angle is corrected to a predetermined value, relay 122 is deactivated and opened. Relay 122 is in series with parallel-connected solenoids 110 of tubings 106. Solenoids 110 are energized by power supply 125. Manual switch 124 enables the pilot to open the roll axis circuit to make it non-functional. Manual switch 123, across relay 122, allows the pilot to activate a roll axis circuit, when relay 122 should fail to operate, as LED 126 would indicate. Power supply 125 needs to have the capacity to activate all three solenoids in parallel.

Figure 15:
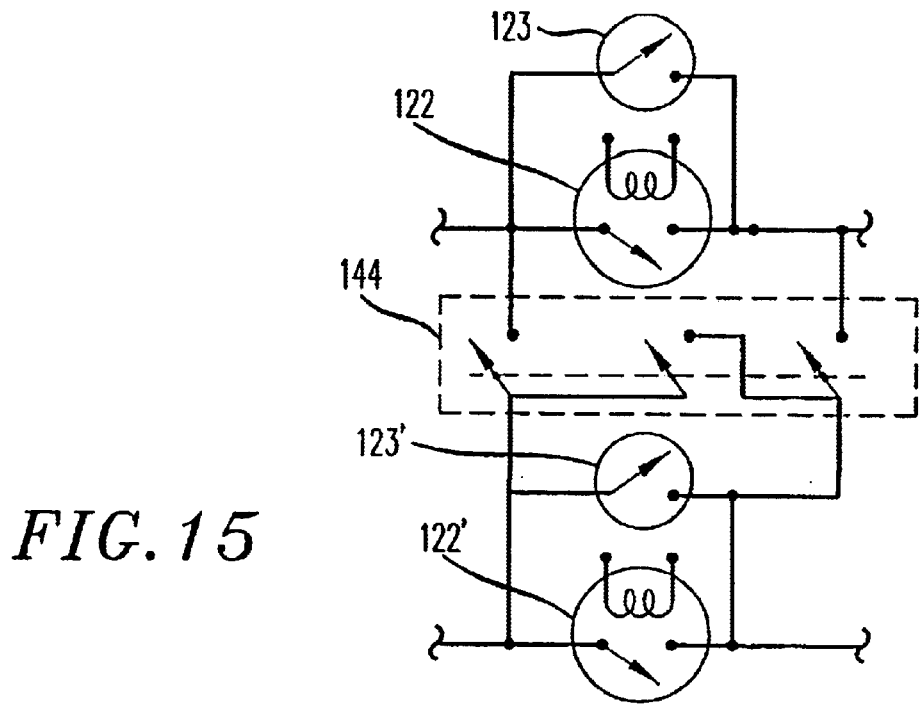
FIG. 15 shows a portion of FIG. 10 depicting the relays and corresponding manual bypass switches for both left and right wings of the aircraft. Thus, if lift for the entire aircraft is needed both manual switches would be closed simultaneously by a triple-pole, single-throw switch.

When buoyancy is desired for the entire aircraft, to enable the aircraft to take-off from the runway more quickly, then the air valves of both left and right wings would be activated by the pilot by closing manual switches 123 and 123', FIG. 15. A triple-pole, single-throw switch (3PST) could be added to short-circuit relays 122 and 122' of both wings simultaneously, thus enabling all tubular air valves on both wings to blast out air, vertically downward, to provide buoyancy, and save aviation gasoline. All tubular air valves also would be opened to enable the aircraft to make a soft landing, when so needed.

Figure 16:
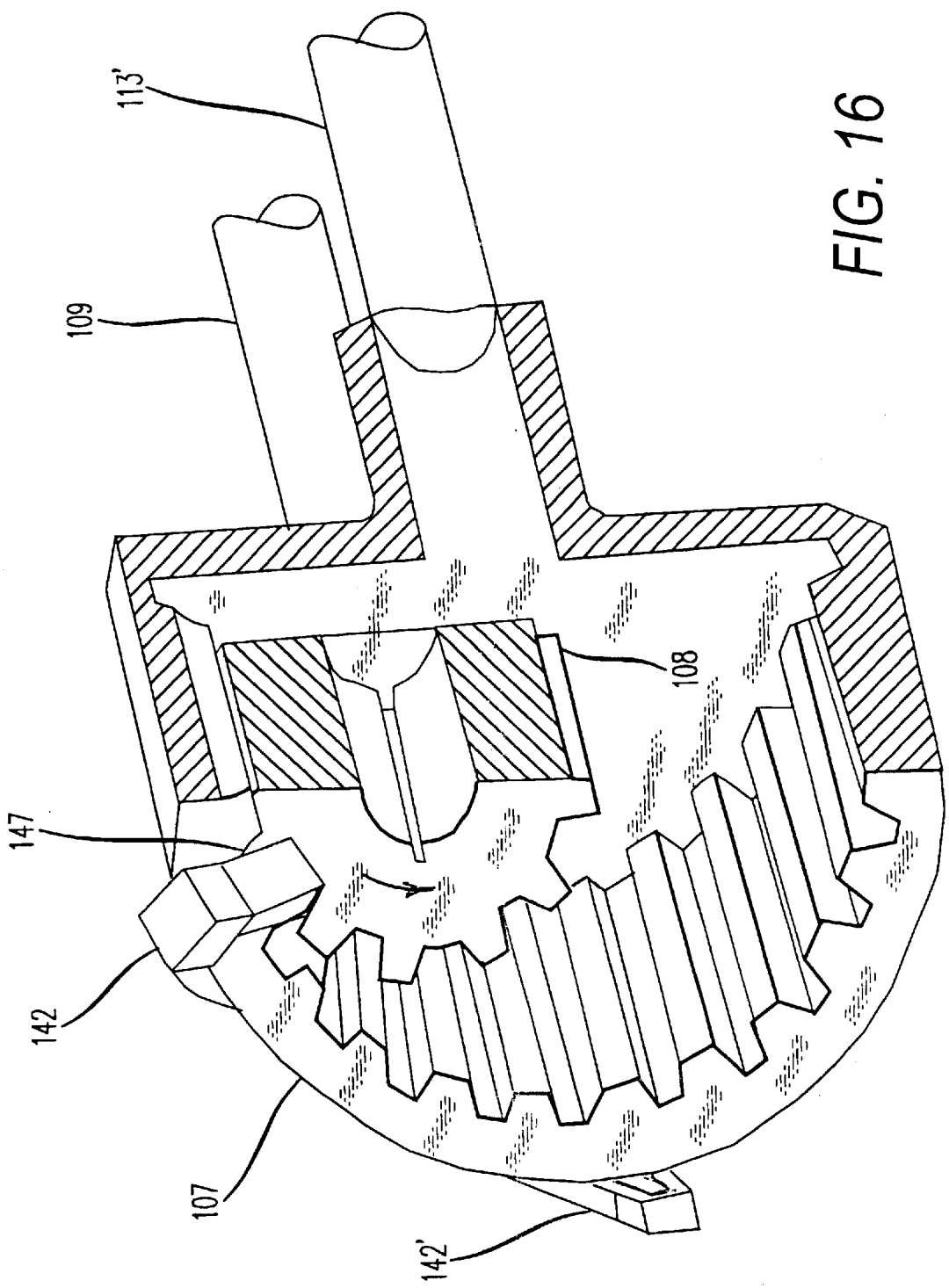
FIG. 16 shows a pinion gear meshing with an internal spur gear, including showing two microswitches angularly 90° apart. A protrusion from the pinion gear is capable of depressing a microswitch, when coming in contact.

Regarding FIG. 14 with Micro Switches 142 and 142', each Micro Switch would be located at the extremes of the angles of rotation of the internal gear 107, say Micro Switch 142 at 0° and the other at 90°, as shown on FIG. 16. At 0°, pinion gear 108 would depress and open switch 142, thereby opening the circuit and avoiding further movement of internal gear 107. When DPDT Switch 129 is thrown from point "a" to point "d", d.c. motor 110' is made to reverse and move away from switch 142. Momentary push button switch 145 or 146 allows d.c. motor to be energized by short-circuiting a Micro Switch, 142' or 142, every time DPDT switch 129 is switched from "a" to "d" or from "d" to "a". Momentary switch 145 or 146 would depress switch 145 or 146 through a mechanical linkage from DPDT switch 129 to enable motors 110' to restart and rotate to the next Micro Switch, depressing it and stopping the d.c. motors, either to close or to open the longitudinal tubular valve. Pinion gear 108 could be provided with a protrusion 147, as shown in FIG. 16 to close either Micro Switch 142 or 142' at 0° or at the 90° angular locations. The position of DTDP switch determines when tubular valve 106 is open or closed to air flow, unless intercepted by relay 130 to keep the valve closed.

If the pilot wants valves 106 open regardless of relay 130's demand, then he closes bypass switch 144, FIG. 44.

Comparing FIG. 14 with FIG. 10, one finds FIG. 18 a simpler circuit and simpler mechanically, and less dependent on the pilot's need to open or close a switch in order to activate the opening or closing of tubular valve cover 106. The advantage to the mechanical configuration of FIG. 3 and circuit, FIG. 14, is that less prime mover torque is required to rotate cover 106, and less energy expended because the only time voltage is needed is when cover 106 needs to be rotated. No standby energy is needed. In mechanical configuration of FIG. 12 and circuit 10, energy is needed either to keep cover 106 open or closed. It should be mentioned that DC motors 110' would have many poles to have slow shaft rotations, so as not to over-run the 0° and 90° locations of the Micro Switches. Motors 110' could also be provided with magnetic brakes, as shown in Gabriel's previous U.S. Pat. No. 5,826,825, FIG. 12, for motors 110' to stop rotating exactly at the 0° and 90° positions.

Figure 8:
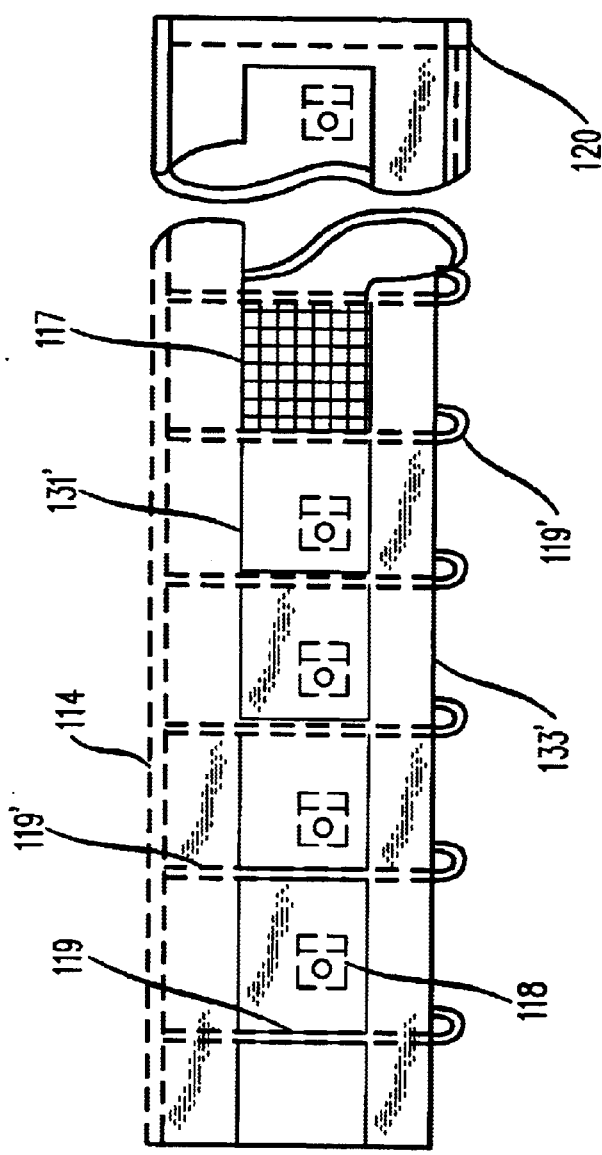
FIG. 8 is a partial side view of the inner stationary tubing of the assembly shown in FIG. 3, showing brackets for mounting onto an aircraft's frame.
Figure 9:
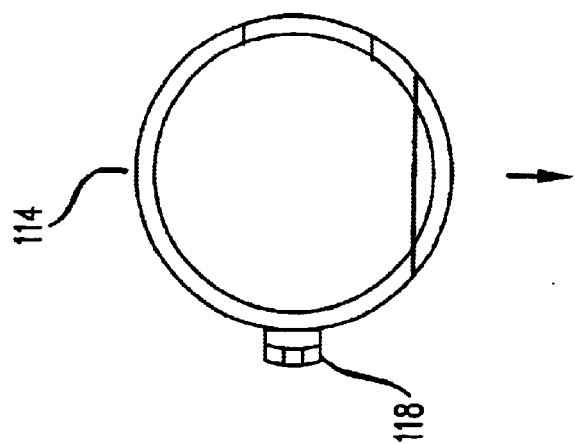
FIG. 9 is an end view thereof.

In FIG. 8, at reinforcement strips 119, partitions 119' are placed and positioned to restrict the air flow within and between partitions 119', in order to reduce the amount of air turbulence within inner tubings 114, allowing air to pass through in a more streamlined manner. Partitions 119' may be either cemented, welded or screwed to inner tubings to keep them rigidly fastened in their positions of separation within the tubings. The type of fastening used for the tubings would depend upon the material selected for the tubings. For example, using rubber cement temporarily for fastening may be appropriate, if material of the tubings were light-weight plastic.

In FIG. 11, a single tubular valve 106 is shown in dashed lines to provide aircraft nose lift when needed. Its circuit would be similar to that of FIG. 10, except with a single solenoid.

Description of Another Preferred Embodiment

In this version of the tubular valve, the outer circular tubing in FIG. 18 is fixed and fastened to the wing's frame, while inner tubing is rotatable 90° by solenoid 110. This construction makes for simpler implementation of the tubular valve onto the aircraft, but would slightly increase resistance to air flow with the valve in the closed position, since a slight crack would occur around each air inlet window, nonexistent when the outer tubing is rotatable. In this version slots 121, FIG. 12 are not needed as outer tubing 106' is stationary. However, the tubing sizes would be approximately the same as in FIGS. 8, 9, 12 and 13. In this version, the inner rotatable tubing 114' is better protected from environmental elements, such as snow, rain and sleet.

FIG. 18 shows solenoid 110 connected to inner tubing 114' via flange cover 127'. Like FIG. 12, the tubing's opposite end is supported by the next solenoid's shaft 109', by cover 120', the solenoid being a double-shaft return-spring device rotary. As in previous tubing designs, with valve 106 in the open position, windows 131' of the inner and outer tubings align or coincide to allow high velocity air to pass through from inlet ports to outlet ports, facing vertically down.

In order to avoid confusion, outer tubing 106', which is fixed to the wing's frame, is shown in dashed lines. Then to enable inner tubing 114' to rotate more easily inside tubing 106', the outside surface of inner tubing 114' could be lubricated. There would be no harm in some leakage of air between inner and outer tubings through ports because of the space existing between inner and outer tubings, when the tubular valve is in its closed position, since the air leakage would be coming through due to the aircraft's motion.

FIG. 17 shows the end view of the tubular valve, including solenoid 110 and bracket 111. Right angle bracket 111, FIGS. 17 and 18, helps support inner tubing 114'. The outer end of tubing 114' is supported by a similar bracket and solenoid 110. The circuit diagram for activating solenoid 110 would be similar to that shown in FIG. 10, assuming three such tubings 106' per aircraft wing. The illumination of LED 126, FIG. 10, notifies the pilot that the air valves on that wing are open for atmospheric air to blow through.

As shown in FIG. 8, these valves, too, are partitioned by circular disks 119', FIG. 12, to reduce air flow turbulence within inner tubing 114'. The opaque disks are placed between windows 131', FIG. 18. The disks are fastened to the inside of inner tubing 114'. Inner tubing's outlet opening is identified as 133'.

Windows 131', FIG. 18, may be circular instead of rectangular, as shown, to reduce air turbulence and strengthen the structure. Both inner and outer tubings' inlets and outlets would apply. In FIG. 18, the superimposed circular openings are shown in dashed lines.

An Improved Preferred Embodiment

Figure 20:
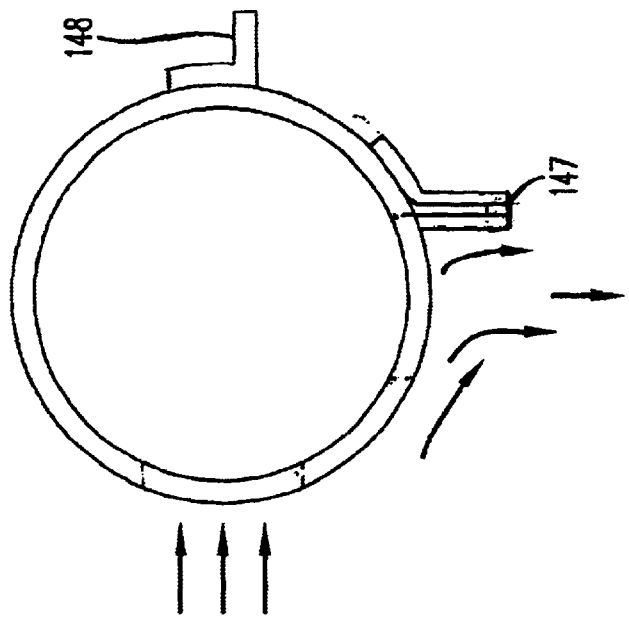
FIG. 20 is an end view thereof, showing the baffle.
Figure 19:
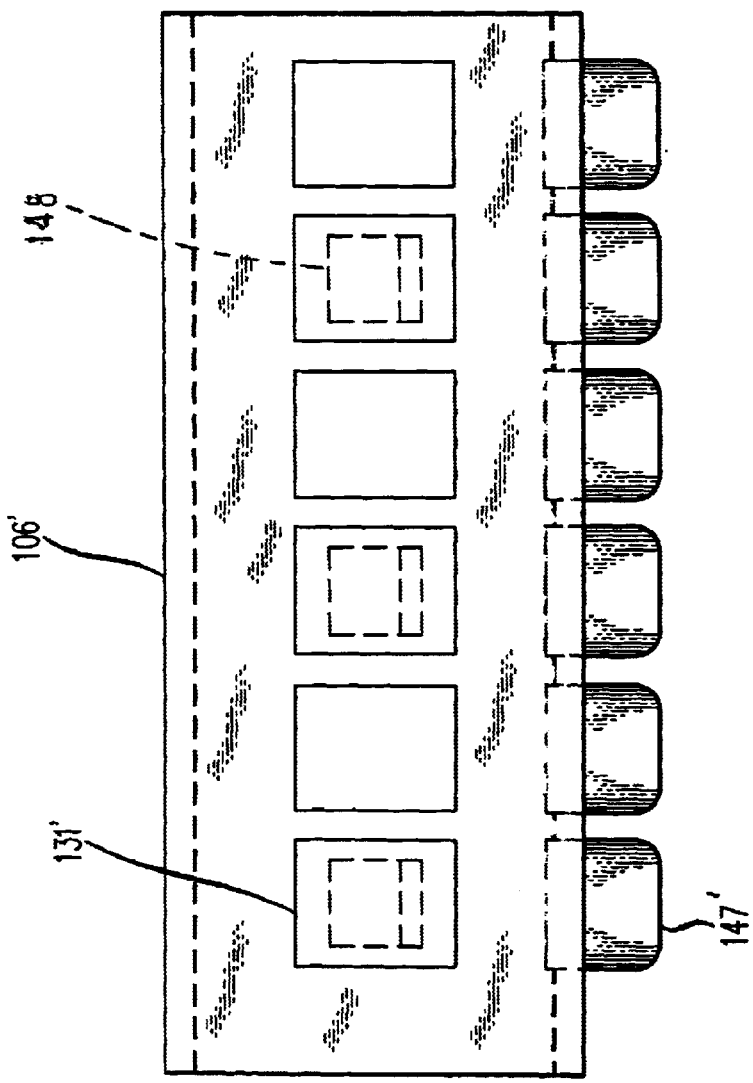
FIG. 19 shows a front view of the outer, stationary elongated tubing with horizontally located inlet ports and outlet ports with baffles facing vertically downward.
Figures 21, 22:
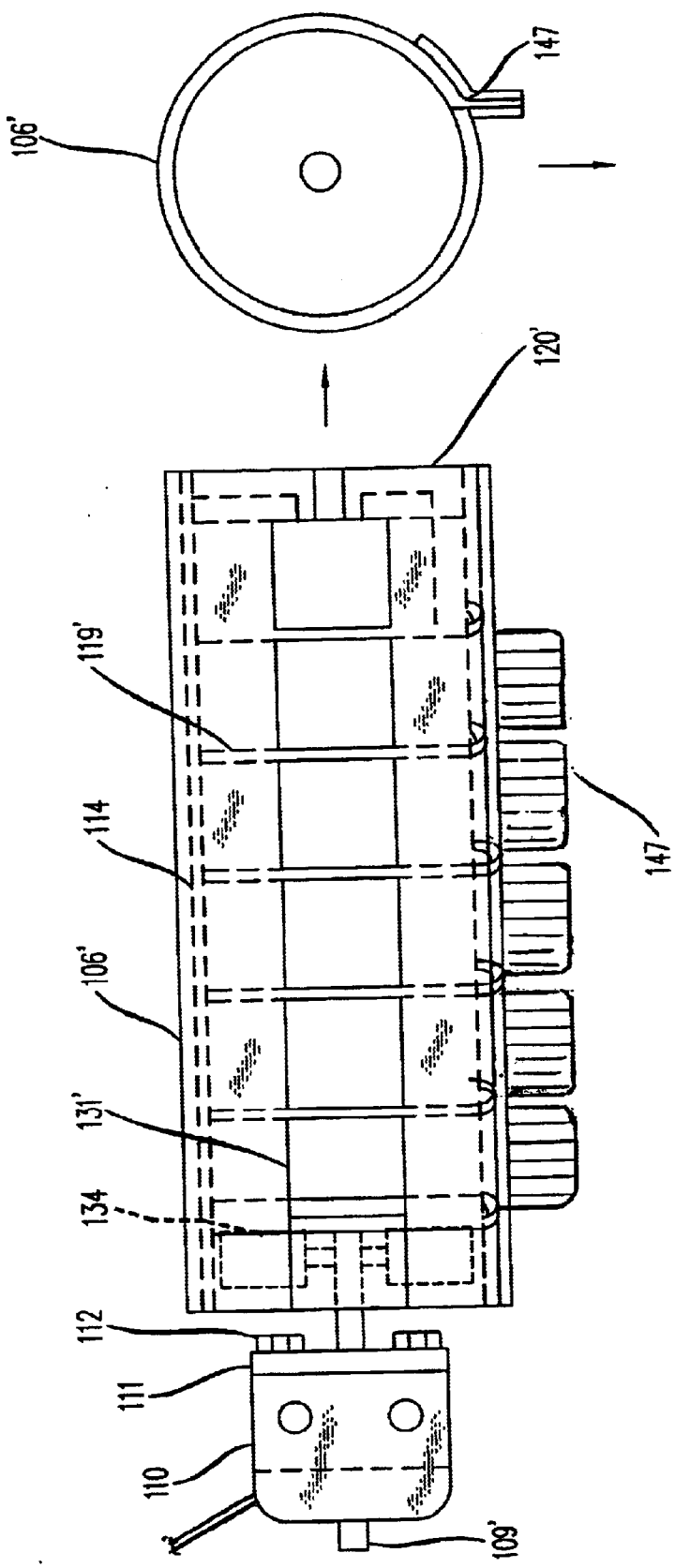
FIG. 21 shows a front view of one of the elongated concentric tubing assemblies, with a stationary outer tubing and a rotatable inner tubing coupled to a prime mover, both tubings having horizontally located windows as air inlet ports and vertical downwardly-located openings as air outlet ports. When ports align the valve is in its open position. When ports of the inner and outer tubings are positioned 90° apart from each other, the valve is in its closed position.
FIG. 22 is an end view thereof, showing the baffle to direct the air rushing out at the outlet downward.

In this elongated tubular valve technique with inlet and outlet ports, the vertically downward outlet ports may be fitted with baffles 147, FIGS. 19 to 22, or with collars 149, FIGS. 23 to 26, to help guide the outlet air vertically downward. In FIGS. 19 and 20, just the outer elongated tubing is shown, showing curved baffles 147 to help direct outflow downward, without offering too much resistance to horizontal airflow. If this tubing length were to be used without an inner tubing, covers would be placed at both ends of tubing 106', such as cover 120, FIG. 8. Inlet and outlet openings 131' and 147' could be circular, as in FIG. 18. Brackets 148, FIG. 20, enable tubing 106' to be fastened to an appropriate part of the aircraft, FIGS. 1 and 11. Arrows show the air entering horizontally and directed to leave vertically, FIG. 20. FIGS. 21 and 22 show the front and end views respectively, of elongated valve assembly, including inner tubing 114. Inner tubing 114, FIG. 21, has covers, 120' and 134 at both ends. Prime mover 110 has its shaft inserted in central hole of cover 134, with pin 152 holding inner rotatable tubing 114 to prime mover shaft 153. Prime mover's 110 shaft would rotate 90o, to either open or close the valve.

Figure 24:
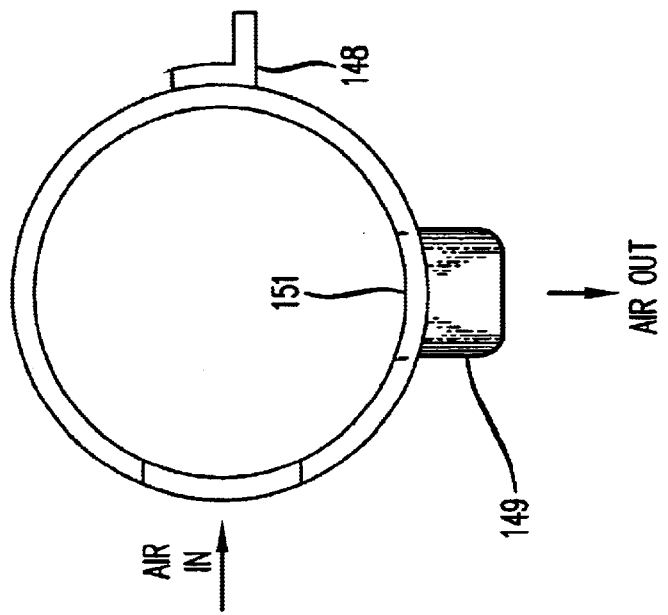
FIG. 24 is an end view thereof showing the collar and a rear bracket for fastening to the aircraft at a suitable location.
Figure 23:
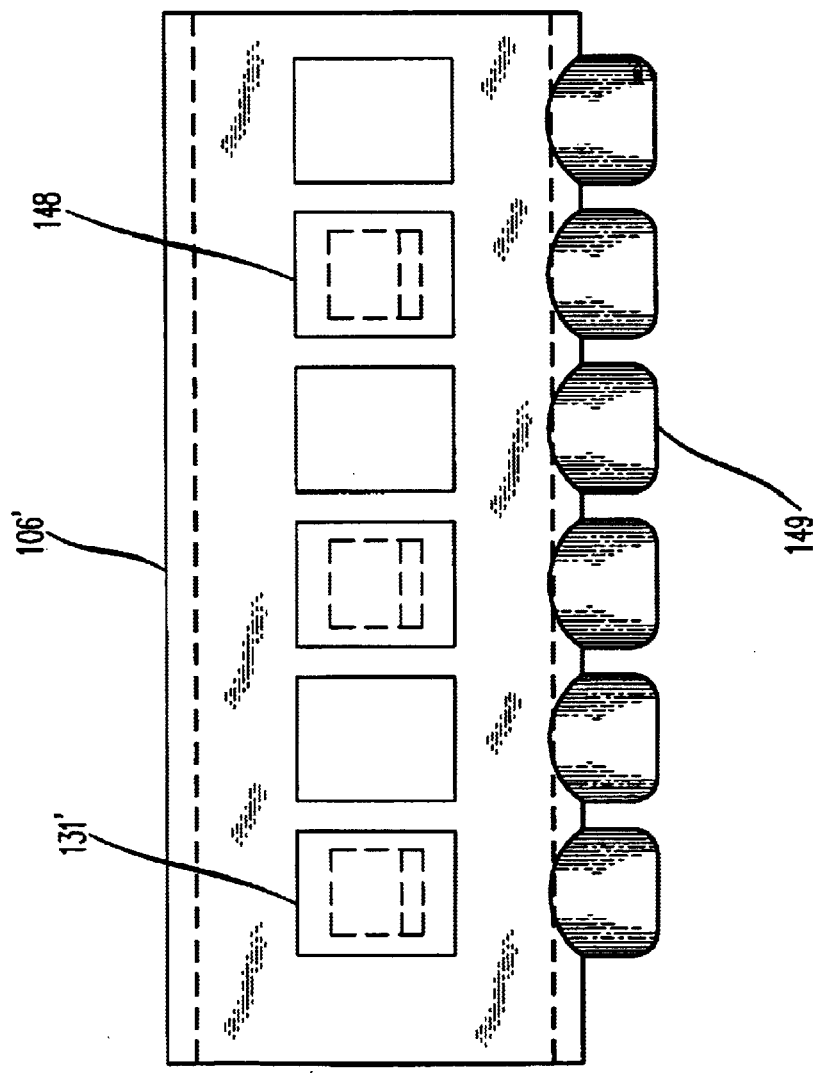
FIG. 23 shows the front view of an outer stationary tubing with horizontally located inlet ports and outlet ports with round collars facing vertically downward.
Figures 25, 26:
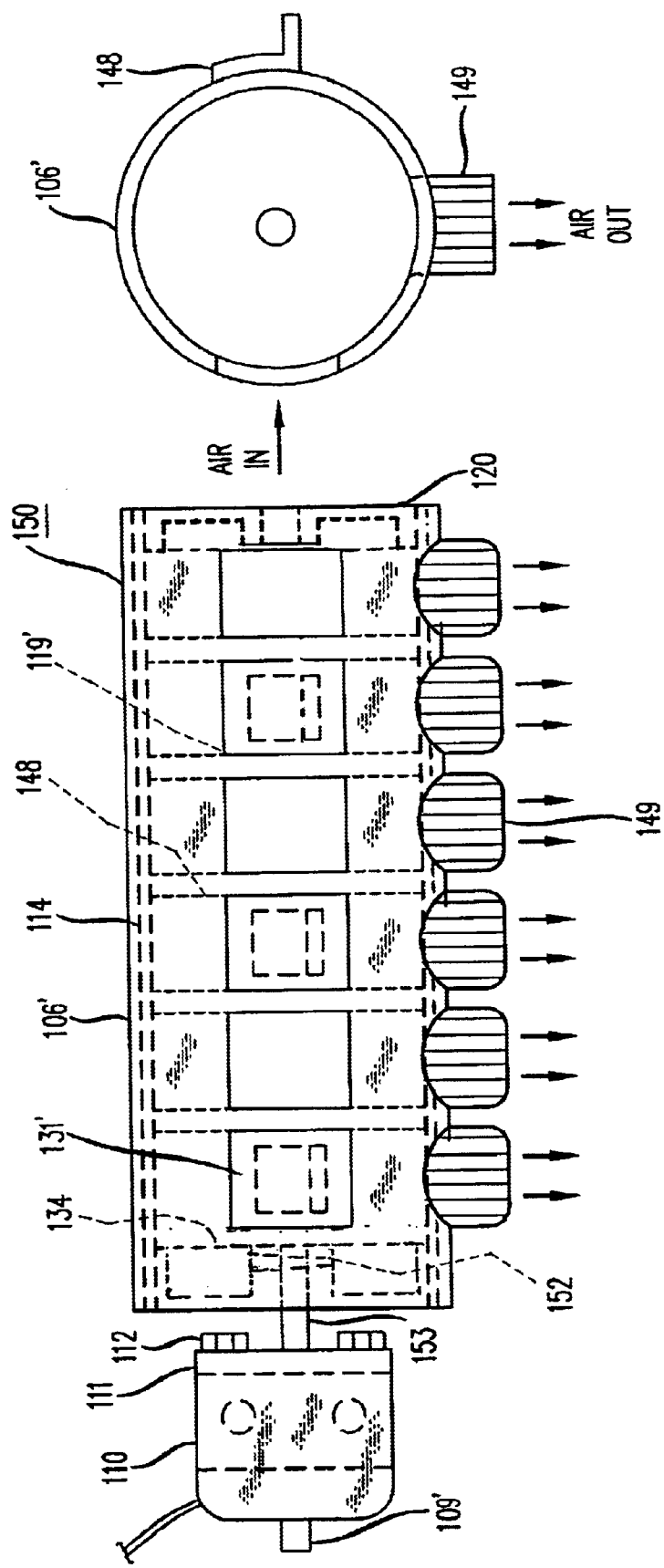
FIG. 25 shows a front view of an elongated concentric tubing assembly, with a stationary outer tubing and a rotatable inner tubing coupled to a prime mover with an attached bracket for mounting on the aircraft, both tubings having horizontally-located windows as air inlet ports and downwardly located openings as air outlet ports with collars fastened thereto to direct the high velocity air downward.
FIG. 26 is an end view thereof showing the collar and a rear bracket for mounting the outer tubing to the aircraft at a suitable location, so that the tubing's inlet ports fact the aircraft's front.

FIGS. 23 and 24 show the outer elongated tubing fitted with collars 149 for helping guide the outflow air vertically downward, without offering much resistance to horizontal air flow, being circular in shape. If this tubing 106' were to be used for lift without an inner rotatable tubing, covers would be attached to both ends of tubing 106', similar to cover 120, FIG. 8. Air inlet openings 131' could be circular as in FIG. 18. Brackets 148, FIG. 24, enable tubing 106' to be fastened to an appropriate part of the aircraft, including inside the aircraft's wing, with openings in the wing's leading edge to coincide and align with the openings or windows of tubing 106'. Arrows, FIG. 24, show the air entering horizontally and directed to leave vertically to provide lift to the aircraft's wing. FIGS. 25 and 26 show the front and end views, respectively, of an elongated valve assembly, with inner tubing 114 placed inside outer tubing 106'. Outer tubing 106' is held in place by brackets 148; and inner tubing 114, with covers 120' and 134, is held in place by bracket 111, attached to prime mover 110. Arrows, FIG. 26, show the air entering horizontally and directed to leave vertically downward to help provide to that aircraft's wing. Prime mover 110 has its shaft inserted in central hole of cover 134, with pin 152 holding inner rotatable tubing 114 to prime mover shaft 153. Prime mover 110, a LEDEX solenoid, would be selected to rotate 90°, to either open or close valve 150, as required.

Definitions of Abbreviations
DPDT=Double-Pole, Double-Throw
3PST=Triple-Pole, Single-Throw
d.c.=direct current
A/C=Aircraft

I claim:

1. An aircraft with a roll angle-control system for avoiding accidental rolling over of said aircraft in flight, said roll angle-control system including at least one elongated tubing with multiple air valves mounted to at least one predetermined location of said aircraft and an electrical control circuit; each elongated tubing with air valves further including an inner circular tubing and an outer circular tubing that is co-axial therewith for allowing selective and relative rotational movement of said inner tubing by a prime mover between an open position and a closed position of said elongated tubing with air valves, said outer circular tubing being adapted for attaching to its predetermined location of the aircraft, said outer circular tubing having a plurality of inlet ports and discharge ports that are selectively spaced thereon, with each of the discharge ports being positioned for discharging air in a downward direction and each of the inlet ports being positioned for allowing air to enter the elongated tubing with air valves at a position that is ninety arc degrees with respect to said discharge ports, said inner circular tubing having a plurality of inlet openings, that are aligned with the inlet ports, and a plurality of discharge openings, that are aligned with the discharge ports when said elongated tubing with air valves is in the open position; said electrical control system further including a rate-of-turn sensor having conditioned roll signals, a voltage supply, a remotely-operated relay, and two manual switches, said remotely-operated relay being energized by the conditioned roll signal from the rate-of-turn sensor for operating said prime mover; the first of said two manual switches adapted for manually by-passing said remotely operated relay for operating said prime mover, the second of said two manual switches for manually opening the electrical circuit for making said roll angle control system inoperative; wherein the open position of the elongated air valve allows air entering the inlet ports as the aircraft is in flight to enter the inner circular tubing then be discharged through the discharge ports and the closed position blocks air from entering the inner circular tubing as said aircraft is in flight.

2. An aircraft in accordance with claim 1, wherein said prime mover is a rotary solenoid able to rotate, via its shaft, said inner tubing a selected number of degrees when energized, and said solenoid shaft rotating in the reverse direction the same number of degrees by spring-return when de-energized.

3. An aircraft in accordance with claim 1, wherein said prime mover being a d.c. electric motor able to rotate, via its shaft, said inner tubing a selected number of degrees when energized, said motor rotating in the reverse direction the same number of degrees by manually switching a double-pole, double-throw switch (DPDT).

4. An aircraft in accordance with claim 1, wherein said aircraft having two wings and wherein lifting for both wings may be needed to avoid said aircraft from crashing, and wherein said electrical control circuit further includes a common third manual switch, said third manual switch being a triple-pole, single throw, 3PST, for by-passing each said remotely operated relay, for enabling the pilot of said aircraft to simultaneously bypass each of said first of the manual switches and the second of the manual switches of said two manual switches of each air valves' electrical control circuit, to open the air valves mounted to each wing of the aircraft, to enable a soft landing of said aircraft.

5. An aircraft in accordance with claim 1, wherein at least one tubing with multiple air valves is added to the underneath of the nose of the aircraft to provide aircraft pitch axis lift, and to make any corrections to the pitch axis angle that would be in excess of a predetermined value, to avoid the aircraft from going into a dive.

6. An aircraft in accordance with claim 3, wherein said electric motor's shaft is provided with a gear reducer to lower the speed of rotation of said shaft when energized.

7. An aircraft in accordance with claim 6, wherein the gear reducer is a pinion gear meshing with an internal spur gear, and Micro Switches limit the angle of rotation of said internal spur gear to at most an angle of 90 degrees, the shaft of the internal gear being coupled to the inner rotatable tubing of the air valves.

8. An aircraft in accordance with claim 1 wherein said air inlets of said outer fixed tubings are being provided with screening to keep out foreign objects.

9. An aircraft in accordance with claim 1, wherein said openings of said inner tubings are held apart by reinforcement strips and wherein said inner tubings are partitioned at each of said reinforcement strips, so that air flow would be restricted within partitions placed between said windows, thus reducing the amount of air turbulence within said inner tubings.

10. A aircraft in accordance with claim 1, wherein said inner tubings being fixed to said aircraft's frame and said outer tubings being rotatable by a prime mover.

11. A aircraft in accordance with claim 1, wherein said inlet and discharge openings of both inner and outer tubings being circular in shape.

12. An aircraft in accordance with claim 1, wherein said air outlets of said tubing with multiple air valves having baffles to assist the high velocity air leaving to be directed vertically downward while said aircraft is in flight, each of said air outlets having one baffle, said, baffle being curved to reduce the air resistance to forward flight, thus providing lift to that wing of the aircraft wherein mounted.

13. An aircraft in accordance with claim 1, wherein said aircraft having two wings and wherein said air outlets of said tubing with multiple air valves having round collars to assist in the high velocity air leaving to be directed downward while said aircraft is in flight, said collars being round to reduce air resistance to forward flight, thus capable of providing lift to that wing of the aircraft wherein mounted; when the mounted tubings with multiple air valves are in open position on both wings, said high velocity air providing lift to the entire aircraft.

* * * * *